US010713199B2

(12) United States Patent
Amarilio et al.

(10) Patent No.: US 10,713,199 B2
(45) Date of Patent: Jul. 14, 2020

(54) HIGH BANDWIDTH SOUNDWIRE MASTER WITH MULTIPLE PRIMARY DATA LANES

(71) Applicant: QUALCOMM Incorporated, San Diego, CA (US)

(72) Inventors: Lior Amarilio, Yokneam (IL); Amit Gil, Zichron Yaakov (IL); Sharon Graif, Zichron Yakov (IL)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/012,532

(22) Filed: Jun. 19, 2018

(65) Prior Publication Data
US 2018/0373659 A1    Dec. 27, 2018

Related U.S. Application Data

(60) Provisional application No. 62/525,556, filed on Jun. 27, 2017.

(51) Int. Cl.
*G06F 13/364* (2006.01)
*G06F 1/08* (2006.01)
(Continued)

(52) U.S. Cl.
CPC .............. *G06F 13/364* (2013.01); *G06F 1/08* (2013.01); *G06F 1/12* (2013.01); *G06F 3/162* (2013.01);
(Continued)

(58) Field of Classification Search
None
See application file for complete search history.

(56) References Cited

U.S. PATENT DOCUMENTS 6,823,411 B2 * 11/2004 Hofmann .............. G06F 13/364
                                                        709/208
8,207,759 B2    6/2012 Boomer et al.
(Continued)

FOREIGN PATENT DOCUMENTS

EP      3008610 B1 *  8/2017  ......... G06F 13/4291
WO   2017112529 A1    6/2017

OTHER PUBLICATIONS

'Advancing the Audio Interface for Mobile and Mobile-Influenced Designs' by Poulsen et al., Jun. 23, 2015. (Year: 2015).*
(Continued)

*Primary Examiner* — Steven G Snyder
(74) *Attorney, Agent, or Firm* — Loza & Loza LLP

(57) ABSTRACT

System, methods and apparatus are described that can improve available bandwidth on a SoundWire bus without increasing the number of pins used by the SoundWire bus. A method performed at a master device coupled to a SoundWire bus includes providing a clock signal by a first master device over a clock line of a SoundWire bus to a first slave device and a second slave device coupled to the SoundWire bus, transmitting first control information from the first master device to the first slave device over a first data line of the SoundWire bus, and transmitting second control information from the first master device to the second slave device over a second data line of the SoundWire bus. The first control information may be different from the second control information and is transmitted concurrently with the second control information.

30 Claims, 12 Drawing Sheets

(51) Int. Cl.

| | | |
|---|---|---|
| *G06F 3/16* | (2006.01) | |
| *H04R 3/00* | (2006.01) | |
| *H04R 3/12* | (2006.01) | |
| *G06F 13/42* | (2006.01) | |
| *G06F 1/12* | (2006.01) | |

(52) U.S. Cl.
CPC ......... *G06F 13/4291* (2013.01); *H04R 3/005* (2013.01); *H04R 3/12* (2013.01); *H04R 3/00* (2013.01); *H04R 2420/03* (2013.01)

(56) References Cited

U.S. PATENT DOCUMENTS

| | | | |
|---|---|---|---|
| 8,686,754 | B2 | 4/2014 | Chopra et al. |
| 9,894,437 | B2* | 2/2018 | Pawlowski ............ H04R 19/04 |
| 9,949,010 | B2* | 4/2018 | Amarilio ................ H04R 3/12 |
| 9,965,410 | B2* | 5/2018 | Mishra .................... G06F 13/18 |
| 10,003,456 | B2* | 6/2018 | Wang ........................ H04L 7/04 |
| 10,073,137 | B2* | 9/2018 | Reiss ............... G01R 31/31705 |
| 10,353,837 | B2* | 7/2019 | Sengoku |
| 10,366,038 | B2* | 7/2019 | Smith ..................... G06F 3/162 |
| 2003/0145144 | A1* | 7/2003 | Hofmann ............. G06F 13/364 710/110 |
| 2008/0189459 | A1* | 8/2008 | Takeuchi ............ G06F 13/4295 710/110 |
| 2008/0195764 | A1* | 8/2008 | Deshpande ......... G06F 13/4291 710/8 |
| 2015/0254198 | A1* | 9/2015 | Anderson ............ G06F 13/364 710/110 |
| 2016/0147684 | A1* | 5/2016 | Sengoku ................ G06F 13/24 710/105 |
| 2016/0147707 | A1* | 5/2016 | Freudenberger .... G06F 13/4291 710/110 |
| 2016/0217090 | A1* | 7/2016 | Sengoku ............... G06F 13/364 |
| 2016/0337741 | A1 | 11/2016 | Amarilio et al. |
| 2017/0168968 | A1* | 6/2017 | Amarilio ................. G06F 13/24 |
| 2017/0212850 | A1* | 7/2017 | Mishra .................. G06F 13/18 |
| 2017/0230750 | A1* | 8/2017 | Pawlowski ............ H04R 19/04 |
| 2017/0250794 | A1 | 8/2017 | Wang et al. |
| 2018/0038908 | A1* | 2/2018 | Reiss ................ G01R 31/31705 |
| 2018/0329857 | A1* | 11/2018 | Mishra ................ G06F 13/4282 |
| 2019/0074026 | A1* | 3/2019 | Poulsen ................ G10L 21/055 |
| 2019/0171590 | A1* | 6/2019 | Mishra .................. G06F 13/1663 |
| 2019/0171595 | A1* | 6/2019 | Mishra .................. G06F 13/362 |
| 2019/0287549 | A1* | 9/2019 | Poulsen ................ G10L 21/055 |

OTHER PUBLICATIONS

International Search Report and Written Opinion—PCT/US2018/038569—ISA/EPO—dated Oct. 15, 2018.
MIPI Alliance: "MIPI Specification for SoundWire—Version 1.0," MIPI Sound, No. Version 1.0, Jan. 1, 2015, p. 289pp, XP009191915.

* cited by examiner

FIG. 3

Bits: 0-15 (300)

| Bits | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| Ping (302) | Ping Req | 0 | 0 | 0 | Rsrv | SSP | Bus Req | Bus Rel | SlvStat-11 | SlvStat-11 | SlvStat-10 | SlvStat-10 | SlvStat-9 | SlvStat-9 | SlvStat-8 | SlvStat-8 |
| Read (304) | 0 | 0 | 1 | 0 | Device Address | | | | Register Address [15:8] | | | | | | | |
| Write (306) | 0 | 1 | 1 | 1 | Device Address | | | | Register Address [15:8] | | | | | | | |
| Reserved (308) | Reserved Opcodes (x5) (318) | | | | Reserved | | | | | | | | | | | |

320 → SlvStat-8

Bits: 16-31

| Bits | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| Ping (302) | SlvStat-7 | SlvStat-7 | SlvStat-6 | SlvStat-6 | SlvStat-5 | SlvStat-5 | SlvStat-4 | SlvStat-4 | 1 | 0 | 1 | 1 | 0 | 0 | 0 | 1 |
| Read (304) | Register Address [7:0] | | | | | | | | | | | | | | | |
| Write (306) | Register Address [7:0] | | | | | | | | | | | | | | | |
| Reserved (308) | Reserved | | | | | | | | | | | | | | | |

Bits: 32-47

| Bits | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| Ping (302) | SlvStat-3 | SlvStat-3 | SlvStat-2 | SlvStat-2 | SlvStat-1 | SlvStat-1 | SlvStat-0 | SlvStat-0 | Dynamic Sync | | | | | Parity | Nak | Ack |
| Read (304) | Read RegData [7:0] | | | | | | | | Dynamic Sync | | | | | Parity | Nak | Ack |
| Write (306) | Write RegData [7:0] | | | | | | | | Dynamic Sync | | | | | Parity | Nak | Ack |
| Reserved (308) | Reserved | | | | | | | | | | | | | | | |

HIGH BANDWIDTH SOUNDWIRE MASTER WITH MULTIPLE PRIMARY DATA LANES

PRIORITY CLAIM

This application claims priority to and the benefit of U.S. Provisional Patent Application Ser. No. 62/525,556 filed in the U.S. Patent Office on Jun. 27, 2017, the entire content of this application being incorporated herein by reference as if fully set forth below in its entirety and for all applicable purposes.

TECHNICAL FIELD

At least one aspect generally relates to data communications interfaces, and more particularly, to data communications interfaces used to connect devices in audiovisual or multimedia systems.

BACKGROUND

Electronic devices, including mobile communication devices, wearable computing devices such as smartwatches, and tablet computers support ever increasing functionalities and capabilities. Many electronic devices include internal microphones and speakers and may include connectors that enable the use of audiovisual equipment including headphones, external speakers, and the like. Communication may be provided through a digital interface defined by one or more standards. In one example, mobile communication devices may employ an interface that conforms to the SoundWire standard specified by the Mobile Industry Processor Interface (MIPI) Alliance. The SoundWire standard defines a multi-wire communication bus.

Demand for increased audiovisual capabilities continues to grow. For example, mobile communications devices may include video cameras and stereo microphones, which may be modified over time to improve performance. In another example, digital processing capabilities may permit an electronic device to implement sound decoders that can provide signals to drive more than two speakers. In these and other examples, improved communications capabilities are needed to enable processing circuits, controllers, coder-decoder (Codec) devices and other components to transmit audio data to multiple audio devices over a common communications bus.

The bandwidth available on a conventional SoundWire bus may limit the number of audio peripherals that can be supported within mobile communication devices. Accordingly, there is an ongoing need for increased bandwidth and improved flexibility in connecting increasing numbers of audio peripherals to a SoundWire bus.

SUMMARY

Certain aspects disclosed herein relate to systems and methods for improving available bandwidth on a SoundWire bus without increasing the number of pins used by the SoundWire bus.

In various aspects of the disclosure, a method performed at a master device coupled to a SoundWire bus includes transmitting a clock signal from a first master device over a clock lane of a SoundWire bus to a first slave device and a second slave device coupled to the SoundWire bus, transmitting first control information from the first master device to the first slave device over a first data lane of the SoundWire bus, and transmitting second control information from the first master device to the second slave device over a second data lane of the SoundWire bus. The first control information may be different from the second control information and may be transmitted concurrently with the second control information.

In one aspect, the first data lane is a primary data lane of the SoundWire bus and the second data lane is a secondary data lane of the SoundWire bus. The first control information may be transmitted in a first frame directed to one or more slave devices coupled to the SoundWire bus. The second control information may be transmitted in a second frame directed to one or more slave devices coupled to the SoundWire bus.

In one aspect, the first master device is configured to transmit control information on the first data lane and the second data lane.

In some aspects, the first master device includes a SoundWire bus interface circuit operable to drive three or more wires of the SoundWire bus. The second slave device may include a SoundWire bus interface circuit configured to support a single data lane.

In certain aspects, the first master device may be configured to send a PING command in the first data lane and the second data lane, enumerate a plurality of devices coupled to the SoundWire bus based on responses to the PING command received from the first slave device and the second slave device. Enumerating the plurality of devices may include assigning a device number to each of the plurality of devices. Each device number may be unique to a wire coupling a corresponding device to the first master device. The first master device may be configured to associate fields of a frame transmitted on the SoundWire bus with a number representing a wire to which a target of the frame is coupled.

In some aspects, the first data lane is a primary data lane driven by the first master device and the second data lane is a primary data lane driven by a second master device. The first master device and the second master device may be provided in an application processor or Codec. The first master device may be configured to synchronize frame timing of the second master device with frame timing of the first master device. The first master device may be configured to synchronize a stream synchronization point defined for the second master device with a stream synchronization point defined for the first master device. The first master device may be configured to synchronize timing of a bank switching signal transmitted by the second master device with a bank switching signal transmitted by the first master device. The bank switching signal transmitted by the second master device may include a broadcast write command.

In various aspects of the disclosure, an apparatus includes a physical interface coupled to a multi-wire link operated as a SoundWire bus. The apparatus may have an application processor coupled to the SoundWire bus and a plurality of slave devices coupled to the SoundWire bus. The application processor may include a processor configured to provide a clock signal by a first master device over a clock lane of a SoundWire bus to a first slave device and a second slave device coupled to the SoundWire bus, transmit first control information from the first master device to the first slave device over a first data lane of the SoundWire bus, and transmit second control information from the first master device to the second slave device over a second data lane of the SoundWire bus. The first control information may be different from the second control information and may be transmitted concurrently with the second control information. The second slave device may be coupled to the SoundWire bus through a two-wire SoundWire interface.

In some aspects, the first data lane is a primary data lane of the SoundWire bus and the second data lane is a secondary data lane of the SoundWire bus. The application processor may include a SoundWire bus interface circuit operable to drive three or more wires of the SoundWire bus. The processor may be configured to transmit the first control information in a first frame directed to one or more slave devices over a first wire of the SoundWire bus. The control information may be transmitted in a second frame directed to one or more slave devices coupled to a second wire of the SoundWire bus.

In certain aspects, the processor is configured to send a PING command on the first data lane and the second data lane, and enumerate a plurality of devices coupled to the SoundWire bus based on responses to the PING command received from the first slave device and the second slave device. The processor may be configured to assign a device number to each of the plurality of devices. Each device number may be unique to a wire coupling a corresponding device to the apparatus. The processor may be configured to associate fields of a frame transmitted on the SoundWire bus with a number representing a wire to which a target of the frame is coupled.

In one aspect, the application processor includes a first interface device configured to operate as a SoundWire master and to transmit a first frame over a primary data lane of the SoundWire bus, a second interface device configured to operate as a SoundWire master and to transmit a second frame over a secondary data lane of the SoundWire bus, and a synchronizing circuit configured to synchronize frame timing of the first interface device with frame timing of the second interface device.

In various aspects, an apparatus includes means for providing a clock signal by a first master device over a clock lane of a SoundWire bus to a first slave device and a second slave device coupled to the SoundWire bus, means for transmitting first control information from the first master device to the first slave device over a first data lane of the SoundWire bus, and means for transmitting second control information from the first master device to the second slave device over a second data lane of the SoundWire bus. The first control information may be different from the second control information and is transmitted concurrently with the second control information. The second slave device may be a two-wire SoundWire interface.

In one aspect, the apparatus includes means for sending a PING command on the first data lane and the second data lane, and means for enumerating a plurality of devices coupled to the SoundWire bus based on responses to the PING command received from the first slave device and the second slave device.

In one aspect, the means for transmitting the first control information includes a first interface device configured to operate as a SoundWire master and to drive a first wire of the SoundWire bus. The means for transmitting the second control information may include a second interface device configured to operate as a SoundWire master and to drive a second wire of the SoundWire bus. The apparatus may include means for synchronizing frame timing of the first interface device with frame timing of the second interface device.

In various aspects, a processor-readable medium stores processor-executable code. The code, when executed by a processor may cause the processor to provide a clock signal by a first master device over a clock lane of a SoundWire bus to a first slave device and a second slave device coupled to the SoundWire bus, transmit first control information from the first master device to the first slave device over a first data lane of the SoundWire bus, and transmit second control information from the first master device to the second slave device over a second data lane of the SoundWire bus. The first control information may be different from the second control information and may be transmitted concurrently with the second control information. The second slave device may have a two-wire SoundWire interface.

In one aspect, the code may cause the processor to send a PING command on the first data lane and the second data lane, and enumerate a plurality of devices coupled to the SoundWire bus based on responses to the PING command received from the first slave device and the second slave device.

In one aspect, the code may cause the processor to transmit the first control information includes a first interface device configured to operate as a SoundWire master and to drive a first wire of the SoundWire bus, transmit the second control information includes a second interface device configured to operate as a SoundWire master and to drive a second wire of the SoundWire bus, and synchronize frame timing of the first interface device with frame timing of the second interface device.

BRIEF DESCRIPTION OF THE DRAWINGS

FIG. 3 illustrates control information transmitted in a SoundWire frame.

DETAILED DESCRIPTION

Figure 1:
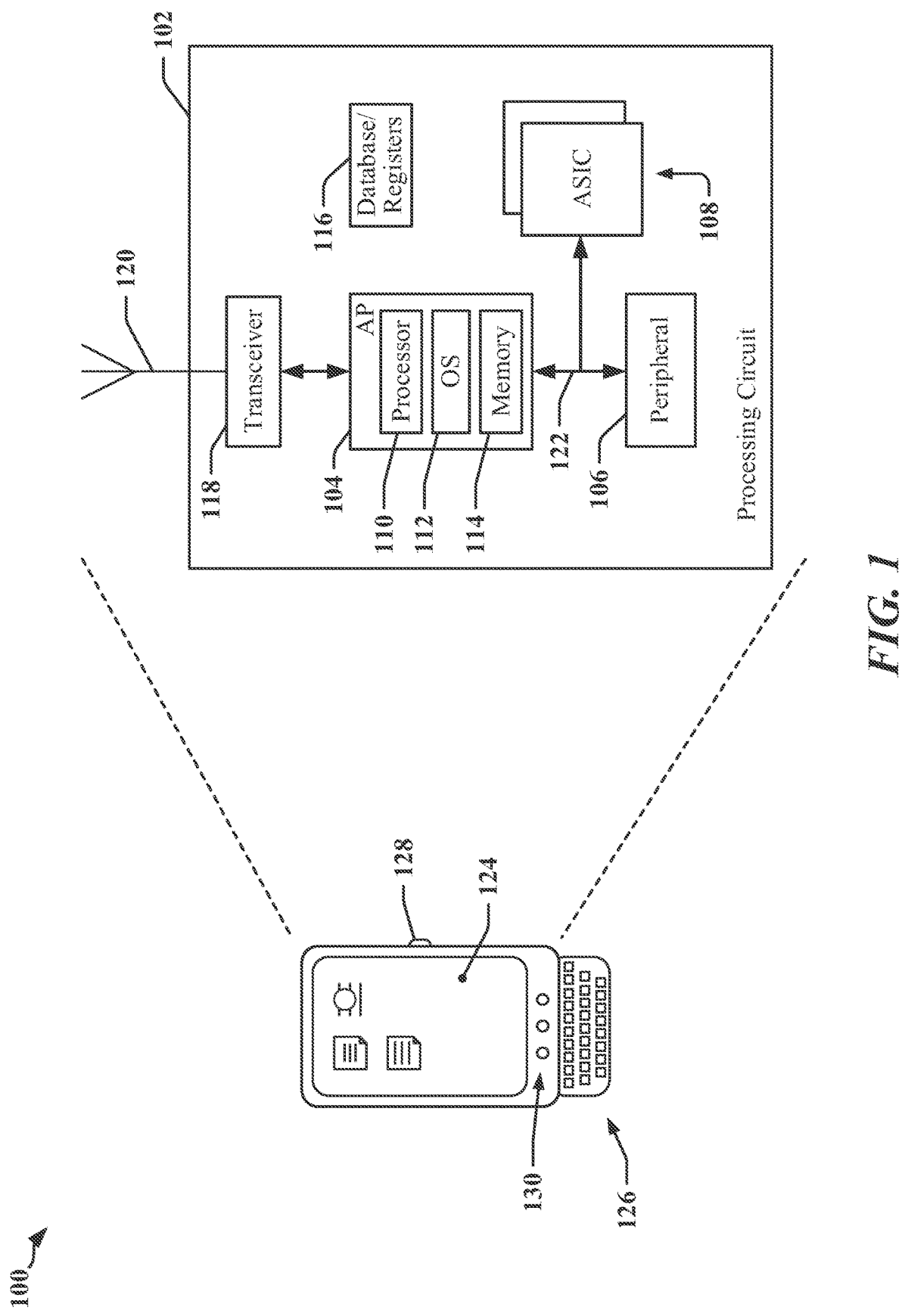
FIG. 1 depicts an apparatus employing a data link between integrated circuit (IC) devices that may be adapted in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), application specific integrated circuits (ASICs), a system-on-chip (SoC), state machines, gated logic, discrete hardware circuits, and other suitable hardware configured to perform the various functionality described throughout this disclosure.

Overview

Certain aspects disclosed herein relate to systems and methods for providing a high-bandwidth SoundWire bus where one or more master devices support multiple primary data lanes and a single, common clock lane. In one implementation, a bus master provides control information on a primary data lane and on one or more secondary data lanes. Two-wire slave devices can be transparently connected to the primary data lane or a secondary data lane, and can receive control information.

In another implementation, two or more master devices provide multiple synchronized primary data lanes, where a common clock signal is used to control transmissions on all data lanes. Synchronization logic controls timing of frame transmission, configuration activation and other synchronization points for all data lanes. For example, a primary master device that provides a clock signal for two groups of slave devices may transmit control information to a first group of slave devices coupled to its primary data lane and a secondary master device may be synchronized to the clock signal and may transmit control information to a second group of slave devices coupled to its primary data lane. In the latter example, timing of bank switching signal sent by both master devices can be synchronized by the primary master device. The bank switching signal may be provided in a broadcast write command.

Example of Mobile Communication Device

FIG. 1 depicts an apparatus 100 that may employ a communication link deployed within and/or between IC devices. In one example, the apparatus 100 may include a radio communication device that communicates through a radio frequency (RF) communications transceiver 118 with a radio access network (RAN), a core access network, the Internet and/or another network. The communications transceiver 118 may be embodied in, or operably coupled to a processing circuit 102. The processing circuit 102 may be implemented using an SoC and/or may one or more IC devices. In one example, the processing circuit 102 may include one or more application processors 104, one or more ASICs 108, and one or more peripheral devices 106 such as Codecs, amplifiers and other audiovisual components. Each ASIC 108 may include one or more processing devices, logic circuits, storage, registers, and so on. An application processor 104 may include a processor 110 and memory 114, and may be controlled by an operating system 112 that is loaded from internal or external storage as data and instructions that are executable by the processor 110. The processing circuit 102 may include or access a local database 116 implemented in the memory 114, for example, where the database 116 can be used to maintain operational parameters and other information used to configure and operate the apparatus 100. The local database 116 may be implemented as a set of registers, or may be implemented in a database module, flash memory, magnetic media, non-volatile or persistent storage, optical media, tape, soft or hard disk, or the like. The processing circuit may also be operably coupled to internal and/or external devices such as an antenna 120, a display 124, operator controls, such as buttons 128, 130 and a keypad 126 among other components.

A data bus 122 may be provided to support communication between the application processor 104, ASICs 108 and/or the peripheral devices 106. The data bus 122 may be operated in accordance with standard protocols defined for interconnecting certain components of mobile devices. For example, there are multiple types of interface defined for communications between an application processor and display and camera components of a mobile device, or between a Codec provided in an ASIC 108 and audio drivers in one of the peripheral devices 106. Some components employ an interface that conforms to standards specified by the Mobile Industry Processor Interface (MIPI) Alliance. For example, the MIPI Alliance defines the SLIMbus and SoundWire interface standards that enable designers of mobile devices to achieve design goals including scalability, reduced power, lower pin count, ease of integration, and consistency between system designs.

The MIPI Alliance standards for SoundWire define a multi-point, multi-wire interface that can be used to communicate information in frames, which may be transmitted over the interface using double data-rate clocking. SoundWire protocols support a configurable frame size and can define multiple channels. Digital audio data may be modulated using pulse-density modulation. The SoundWire interface is optimized for low-power and low-latency, and supports payload granularity of a single bit.

Overview of the SoundWire Architecture

Figure 2:
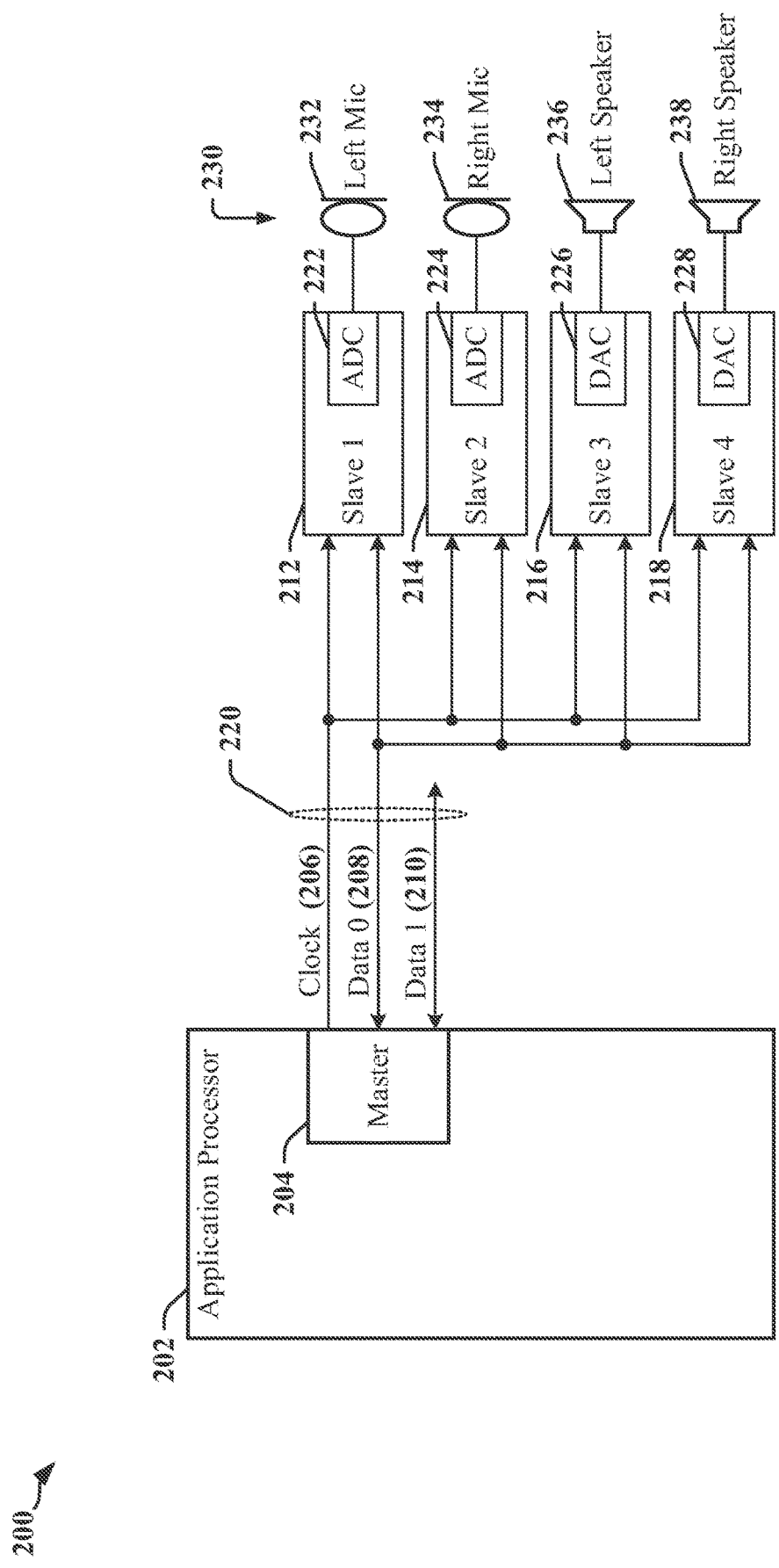
FIG. 2 illustrates an example of system architecture for a SoundWire system that may be adapted in accordance with certain aspects disclosed herein.

FIG. 2 illustrates an example of a SoundWire system 200. A variety of devices may be connected to a SoundWire bus, including audio headsets, Codecs, amplifiers, repeaters, switches, bridges, and signal processing devices. A system clock at 32 kHz may be distributed with minimal command and control. In the illustrated SoundWire system 200, an application processor 202, or other IC device, may include a Codec or be configured to operate as a Codec, and may be configured to communicate through a physical interface that is operated as a SoundWire bus master 204. The SoundWire bus master 204 may include lane drivers and receivers, SoundWire encoders and decoders, a state machine and/or a sequencer, as well as other logic circuits. In some instances, the SoundWire bus master 204 may be implemented in a Codec. The lane drivers and receivers of the SoundWire bus master 204 may be coupled to the wires of a multi-wire bus 220 through designated terminals of the application processor 202.

In the illustrated example, the application processor 202 communicates with at least four slave devices 212, 214, 216, 218 that are associated with audio input/output devices 230. A first slave device 212 includes an analog-to-digital convertor (ADC 222) that digitizes input received from a left-side microphone 232, a second slave device 214 includes an ADC 224 that digitizes input received from a right-side microphone 234, a third slave device 216 includes a digital-to-analog convertor (DAC 226) that provides an output to drive a left-side loudspeaker 236, and a fourth slave device 218 includes an DAC 228 that provides an output to drive a right-side loudspeaker 238.

In the SoundWire system 200, the application processor 202 is coupled to the slave devices 212, 214, 216, 218 through the multi-wire bus 220. The multi-wire bus 220 may be configured to provide a clock lane 206 and one or more data lanes 208, 210. Up to eight data lanes 208, 210 may be provided on corresponding wires of the multi-wire bus 220. The SoundWire specification defines a fixed frame that may be transmitted over multiple data lanes. In practice, each data lane 208, 210 is assigned to one of the physical wires of the multi-wire bus 220. The frame can have rows and columns. In each row, bit slots are provided that may be allocated to sources. The allocation of each bit slot may be changed from one source to any other source. The multi-wire bus 220 may be configured by the SoundWire bus master 204. The SoundWire bus master 204 may control data transport on up to eight data lanes 208, 210 of the multi-wire bus 220.

FIG. 3 illustrates control information 300 transmitted in the first 48 bits, or column 0, in a SoundWire frame. The SoundWire bus master 204 may use these 48 bits to transmit control information. Bits 00-03 select a command code, and where commands include a ping command 302, a read command 304, a write command 306. Five other commands 318 (illustrated collectively as the reserved command 308) may be available for transmission. Certain bits in the control information 300 have different meanings for different commands 302, 304, 306, 308. In one example, bits 04-07 include a device address for read and write commands 304, 306. The SoundWire bus master 204 can address and support up to 11 slave devices 212, 214, 216, 218. In another example, bits 08-23 include a register address for read and write commands 304, 306. Some bits have the same meaning and/or setting regardless of the configured command. For example, bits 40-44 serve as a dynamic sync pattern for some or all commands 302, 304, 306, 308.

Bandwidth Limitations in SoundWire

A SoundWire audio interface can allocate data channels over up to 7 additional data lanes when demand for aggregated bandwidth (i.e., bandwidth for multiple devices) exceeds the bandwidth that is available on a single data lane 208. A design objective of the SoundWire protocol is to provide low-gate, low-cost, end-point devices, including microphone and speakers. In some instances, low-cost, end-point devices are provided with a clock pin and a single data pin to reduce cost of the devices.

Figure 4:
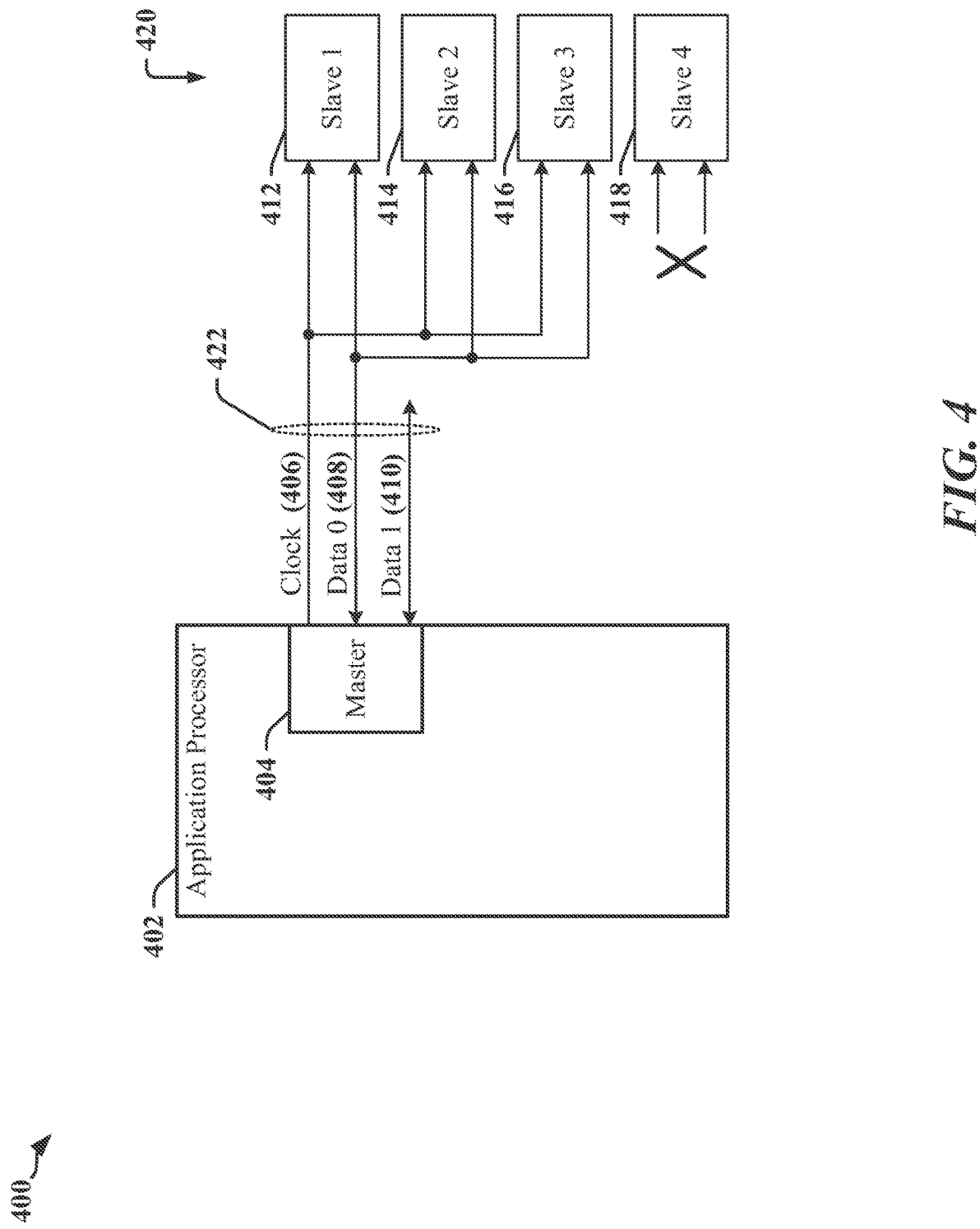
FIG. 4 illustrates a system in which one or more slave devices are implemented with a single data lane.

FIG. 4 illustrates a system 400 in which an application processor 402 includes a SoundWire bus master 404 that supports multiple data lanes and a plurality of slave devices 420 of which one or more slave devices 412, 414, 416, 418 are implemented with a single data lane SoundWire interface. Each slave device 412, 414, 416, 418 can be coupled to the clock lane 406 and primary data lane 408 of the SoundWire bus 422. In the illustrated system 400, the bandwidth of the primary data lane 408 used by three slave devices 412, 414, 416 leaves insufficient capacity on the primary data lane to support a fourth slave device 418. In conventional SoundWire implementations, control information is transmitted only through the primary data lane 408. In the illustrated system 400, the fourth slave device 418 has a single data pin and cannot use a secondary data lane 410 without also connecting to the primary data lane 408. Accordingly, the number of devices that can be connected to a conventional SoundWire bus 422 is limited due to the bandwidth of the primary data lane 408.

Figure 5:
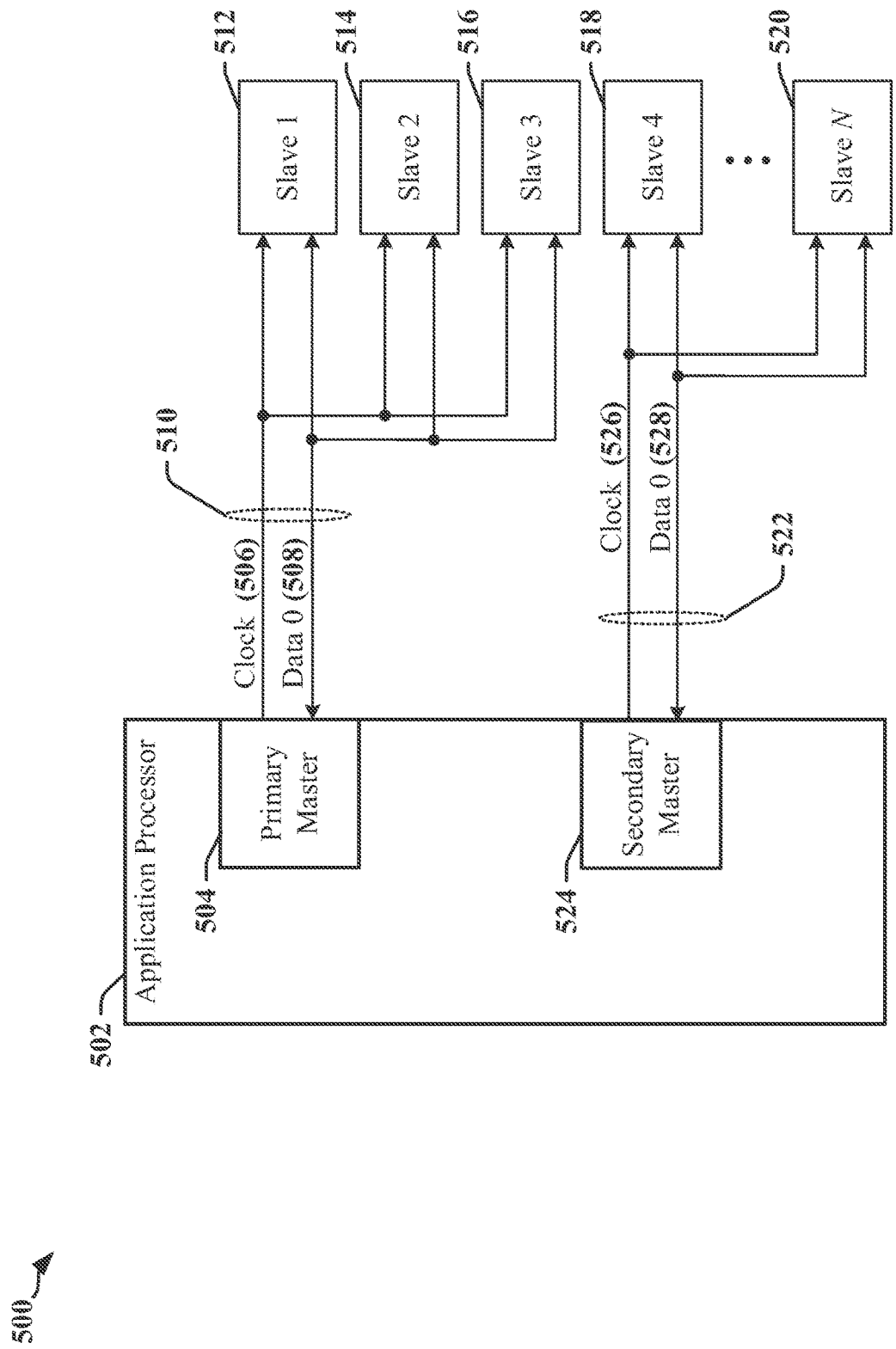
FIG. 5 illustrates a system in which an application processor includes multiple SoundWire bus masters.

In certain aspects of the disclosure, multiple master devices may be provided in an Application Processor to enable a greater numbers of slave devices to be coupled to a primary data lane. FIG. 5 illustrates a system 500 in which an application processor 502 includes multiple SoundWire bus masters 504, 524, each driving a respective primary data lane 508, 528. In some instances, the SoundWire bus masters 504, 524 may be configured to drive one or more additional data lanes. The availability of multiple primary data lanes 508, 528 enables the application processor 502 to communicate with multiple slave devices 512, 514, 516, 518, 520 of which one or more of the slave devices 512, 514, 516, 518, 520 are implemented with a SoundWire interface that provides a single data lane. Each of a first group of slave devices 512, 514, 516 can be coupled to the primary data lane 508 of a primary SoundWire bus master 504, while a second group of slave devices 518, 520 can be coupled to the primary data lane 528 of a secondary SoundWire bus master 524 The illustrated system 500 can accommodate slave devices 512, 514, 516, 518, 520 that have a single data pin when aggregate bandwidth exceeds the capacity of the primary data lane 508 of the first SoundWire bus master 504. The second SoundWire bus master 524 provides an additional primary data lane 528 that carries control information.

The system 500 provides two clock lanes 506, 526, which increases the pin count of the application processor 502 and increases the overall cost of the system 500. Bus management complexity is also increased because the system includes two separate SoundWire buses 510, 522 that are managed independently. The SoundWire specifications do not require synchronization of SoundWire bus masters and provide no procedures for synchronizing bus masters. Operational issues affecting audio recording and playback can arise when clock signals, frame-start timing, stream synchronization point (SSP) and bank-switching are not synchronized or coordinated. Bank-switching is used to switch between system configurations. Registers for each slave device 512, 514, 516, 518 may be written to implement a new configuration, where the new configuration is activated when a bank-switch signal is provided to the slave devices 512, 514, 516, 518 to cause the newly-written register values to be applied to the respective slave devices 512, 514, 516, 518 at the same point in time. The use of two different SoundWire bus masters 504, 524 can prevent synchronized adoption of new configurations.

Improving SoundWire Bandwidth Using Enhanced Secondary Data Lanes

Figure 6:
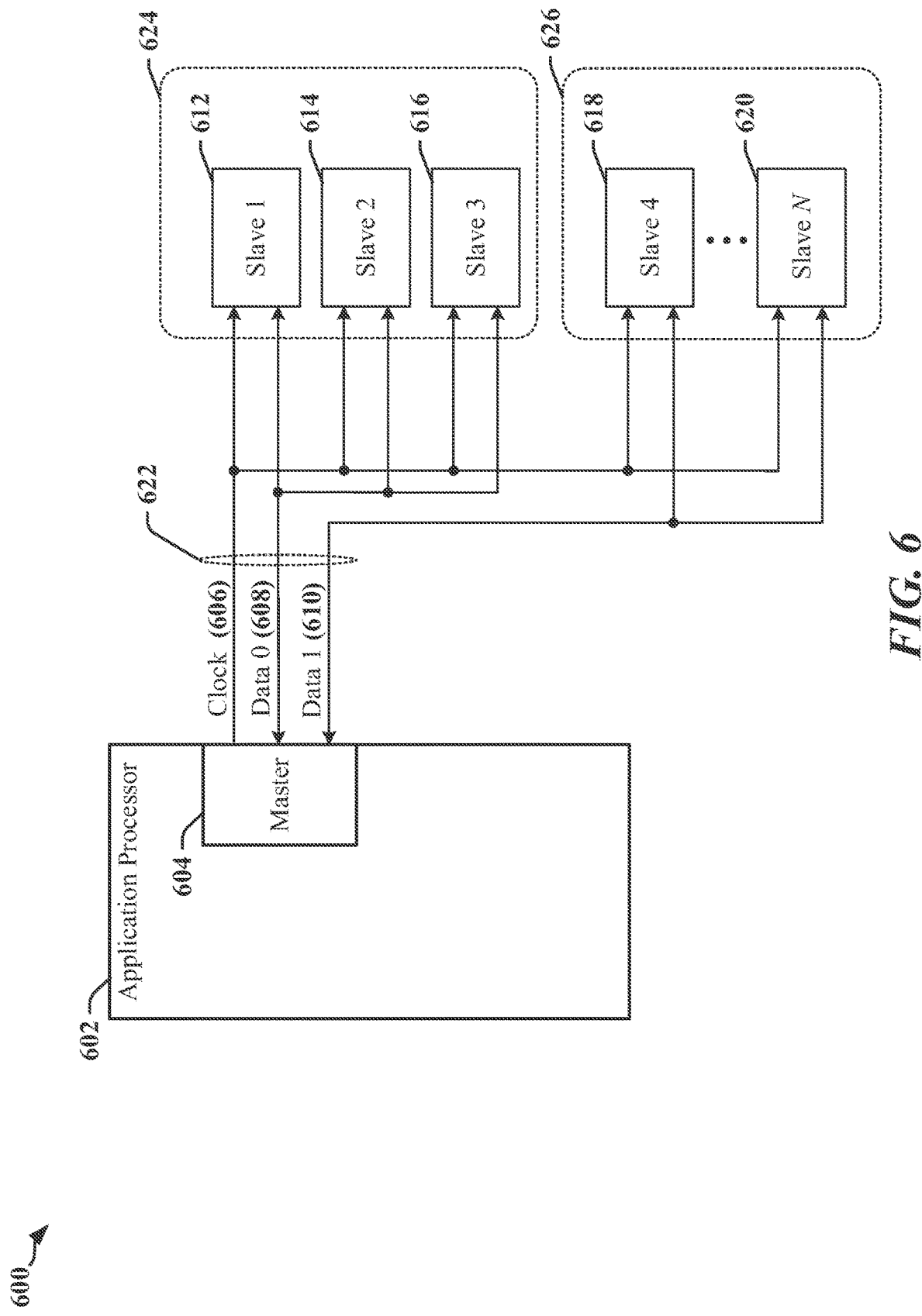
FIG. 6 illustrates a system that is adapted according to certain aspects disclosed herein to support a single data pin slave devices in high-bandwidth applications.

FIG. 6 illustrates a system 600 adapted according to certain aspects disclosed herein to enable an application processor 602 to support a plurality of single data pin slave devices 620 in high-bandwidth applications. The application processor 602 includes a SoundWire bus master 604 that is adapted to transmit control information on a primary data lane 608 and on one or more secondary data lanes, including the secondary data lane 610 shown in FIG. 6. The secondary data lane 610 can be used to support slave devices equipped with a single-data lane. The SoundWire bus master 604 may be coupled to the wires of a SoundWire bus 622 through designated terminals of the application processor 602.

In the illustrated system 600, a bus master 604 in the application processor 602 supports the SoundWire bus 622 that has a clock lane 606, primary data lane 608 and a secondary data lane 610. Slave devices 612, 614, 616, 618, 620 are implemented with a SoundWire interface that supports a single data lane. Each slave device 612, 614, 616, 618, 620 is coupled to the clock lane 606.

A first group of slave devices 624 is coupled to the primary data lane 608 of the SoundWire bus 622, and a second group of slave devices 626 is coupled to the secondary data lane 610 of the SoundWire bus 622. Control information is transmitted concurrently on both data lanes 608, 610. The primary data lane 608 carries control information for first group of slave devices 624 and the secondary data lane 610 carries control information for second group of slave devices 626. The ability to transmit control information on the secondary data lane 610 enables the number of devices that can be connected to the SoundWire bus 622 to be determined independently of the bandwidth provided by the primary data lane 608. Furthermore, the ability to transmit control information with different or modified addresses on the primary data lane 608 and the secondary data lane 610 enables the total number of devices supported on the SoundWire bus 622 to be increased beyond the 11-device limitation imposed by the SoundWire specifications for a single interface.

In some implementations, the system 600 may maintain the 11-device limitation imposed by the SoundWire specifications for a single interface. In one example, the addressing scheme used on the primary data lane 608 may be maintained on the secondary data lane 610. Other implementations use independent and/or expanded addressing schemes on the primary data lane 608 and the secondary data lane 610, permitting more than 11 slave devices to be supported on the SoundWire bus 622. For example, SlvStat fields 320 (see FIG. 3) corresponding to each independent secondary data lane may be mapped onto a higher logical address and/or slave number managed by the SoundWire interface.

Figure 7:
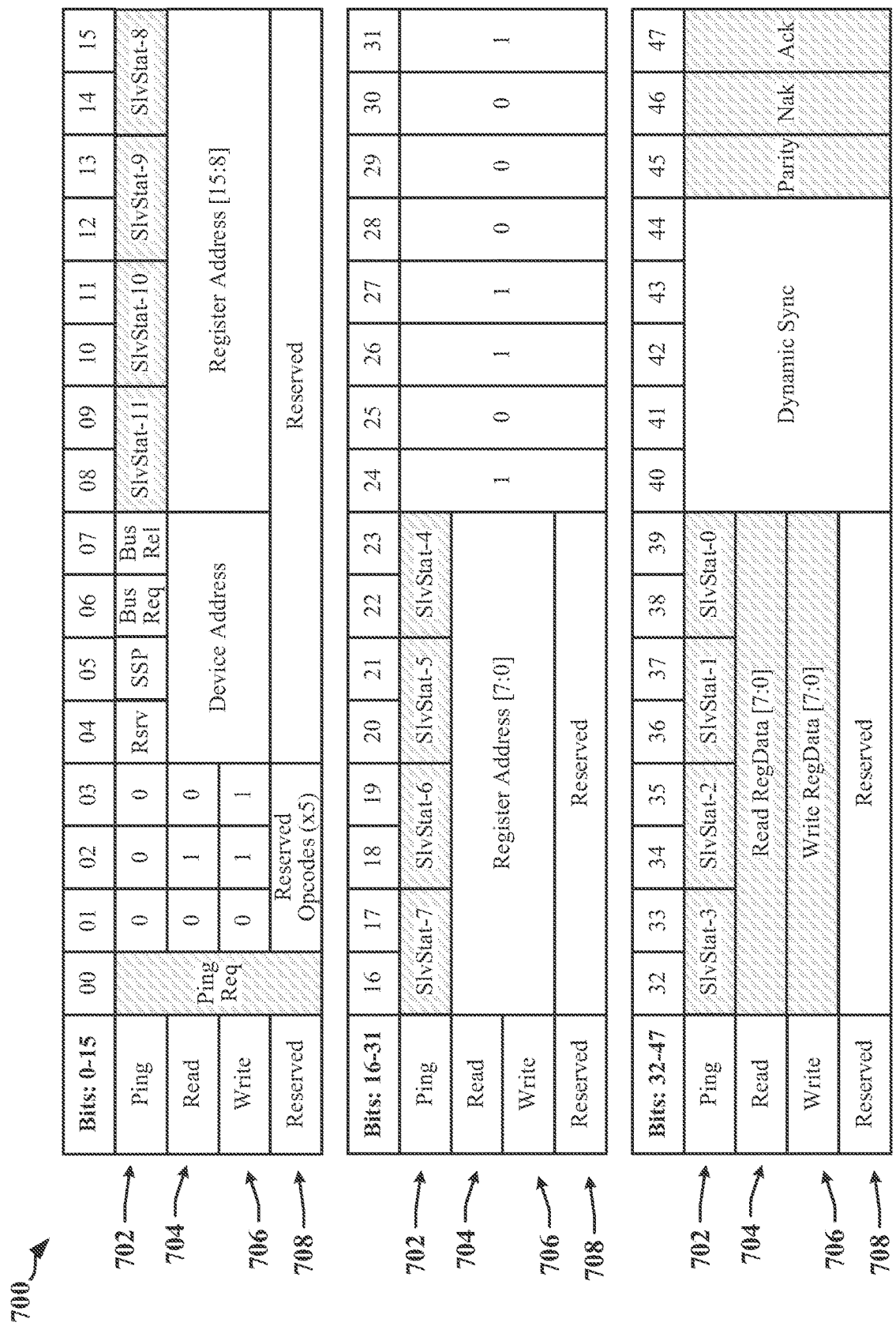
FIG. 7 illustrates data lane enumeration in control information transmitted in a SoundWire frame in accordance with certain aspects disclosed herein.

The slave devices 612, 614, 616, 618, 620 connected to the clock lane 606, and to one of the data lanes 608, 610 of the SoundWire bus 622 need not be aware of the existence of two groups of slave devices 624, 626 and associated adaptation of the SoundWire bus master 604. The SoundWire bus master 604 may be adapted to relate the data lane 608, 610 used to connect the groups of slave devices 624, 626 to corresponding fields of the control information. The control information that is adapted or configured based on the physical configuration of the SoundWire bus 622 may be primarily found in the first 48-bits, or column 0, in a transmitted frame. FIG. 7 illustrates the fields 700 in which data lane enumeration is tracked by the SoundWire bus master 604.

In the illustrated system 600, the SoundWire bus master 604 is configured to assign channels, transmission slots and other timing information used in communicating with the slave devices 612, 614, 616, 618, 620 in the two groups of slave devices 624, 626. The SoundWire bus master 604 may maintain enumeration information that identifies the data lane 608, 610 from which data has been received or on which data is to be transmitted.

Examples of treatment of data fields are illustrated in the tables below. Tables 1-5 provided below illustrate an implementation in which an index "[N]" is added to fields that are enumerated and related to data lanes 608, 610. In the illustrated system 600, information may be transmitted over the primary data lane 608 when N=0 and over the secondary data lane 610 when N=1.

TABLE 1

Bits Common To All Commands

| Bit # | Bit Name | Behavior | Owner of bit |
|---|---|---|---|
| 00 | PREQ[N] | Master performs a logical-OR on all PREQ[N], and threat that as PREQ | Slave coupled to bus |
| 01, 02, 03 | Command | Master duplicates value of data 0 | Master |
| 24-32 | Static Sync | Master duplicates value of data 0 | Master |
| 41-44 | Dynamic Sync | Master duplicates value of data 0 | Master |
| 45 | Parity[N] | Master calculates the PAR[N] for each data lane independently, in a similar calculation formula as data 0. The parity calculation of window from BitSlot [44, 1]. T BitSlot [43, LAST] of the transport information on the data of this data lane | Master |
| 46 | NAK[N] | Negative Acknowledge, indicating failure of a command in the respective data lane [N]. (see next) | Master and Slave coupled to bus |
| 47 | ACK[N] | Positive Acknowledge, indicating success of a command in this respective data lane [N] | Master and Slave coupled to bus |

TABLE 2

Bits for PING command

| Bit # | Bit Name | Behavior | Owner of bit |
|---|---|---|---|
| 05 | SSP | Master duplicates value of data 0 | Master |
| 06 | BREQ | Not supported in modified data 1-7 | Monitor |
| 07 | BREL | Not supported in modified data1-7; Keep '0' for all data lanes | Master |
| 08-09 | Slv_Stat_11[1:0] [N] | Slave report its status as attached. | Attached slave |
| 10-11 | Slv_Stat_10[1:0] [N] | | Attached slave |
| 12-13 | Slv_Stat_09[1:0] [N] | Master performs a logical-OR on values from all [N] data lanes, and treat as Slv_stat_XX. | Attached slave |
| 14-15 | Slv_Stat_08[1:0] [N] | | Attached slave |
| 16-17 | Slv_Stat_07[1:0] [N] | | Attached slave |
| 18-19 | Slv_Stat_06[1:0] [N] | | Attached slave |
| 20-21 | Slv_Stat_05[1:0] [N] | | Attached slave |
| 22-23 | Slv_Stat_04[1:0] [N] | Master assigns a unique slave number across all [N] data lanes. | Attached slave |
| 33-34 | Slv_Stat_03[1:0] [N] | | Attached slave |
| 35-36 | Slv_Stat_02[1:0] [N] | | Attached slave |
| 37-38 | Slv_Stat_01[1:0] [N] | Master tracks accumulative slave status for interrupt request. | Attached slave |
| 39-40 | Slv_Stat_00[l:0] [N] | Slave reports its status - Master performs a logical-OR on all [N] data lanes, and treats as Slv_stat_00 | Unattached slave |

TABLE 3

Bits for READ/WRITE command

| Bit # | Bit Name | Behavior | Owner of bit |
|---|---|---|---|
| 04-07 | DevAddr[3:0] | Master duplicates value of data 0 to all data[N] | Master |
| 08-23 | RegAddr[15:0] | Master duplicates value of data 0 to all data[N] | Master |

TABLE 4

Bits for READ command

| Bit # | Bit Name | Behavior | Owner of bit |
|---|---|---|---|
| 33-40 | RegAddr[7:0] [N] | Register data sent from addressed device Master uses the read value from the relevant slave only if command-OK state | Addressed slave |

TABLE 5

Bits for WRIGHT command

| Bit # | Bit Name | Behavior | Owner of bit |
|---|---|---|---|
| 33-40 | RegAddr[7:0] [N] | Register data sent from the addressed device The master typically duplicates the write data to all data lanes, except for enumeration phase | Addressed slave |

The SoundWire bus master 604 may process parity received from either or both data lanes 608 and 610, where the parity is associated with data transmitted by one or more of the slave devices 612, 614, 616, 618, 620 over an associated data lane 608 and 610. In some instances, the SoundWire bus master 604 may calculate parity independently for each data lane 608, 610 to determine whether data has been received without error by the SoundWire bus master 604. The SoundWire bus master 604 may receive and/or respond to negative acknowledgements transmitted by one or more of the slave devices 612, 614, 616, 618, 620 over an associated data lane 608 and 610. In one example, the SoundWire bus master 604 may combine NAK bits from each data lane 608, 610 to determine whether a frame of data has been received without error by all of the slave devices 612, 614, 616, 618, 620. In another example, the SoundWire bus master 604 may process NAK bits transmitted on one of the data lanes 608, 610 by one or more slave device 612, 614, 616, 618, 620 independently to identify the slave devices 612, 614, 616, 618, 620 that is signaling a received data error.

Figure 8:
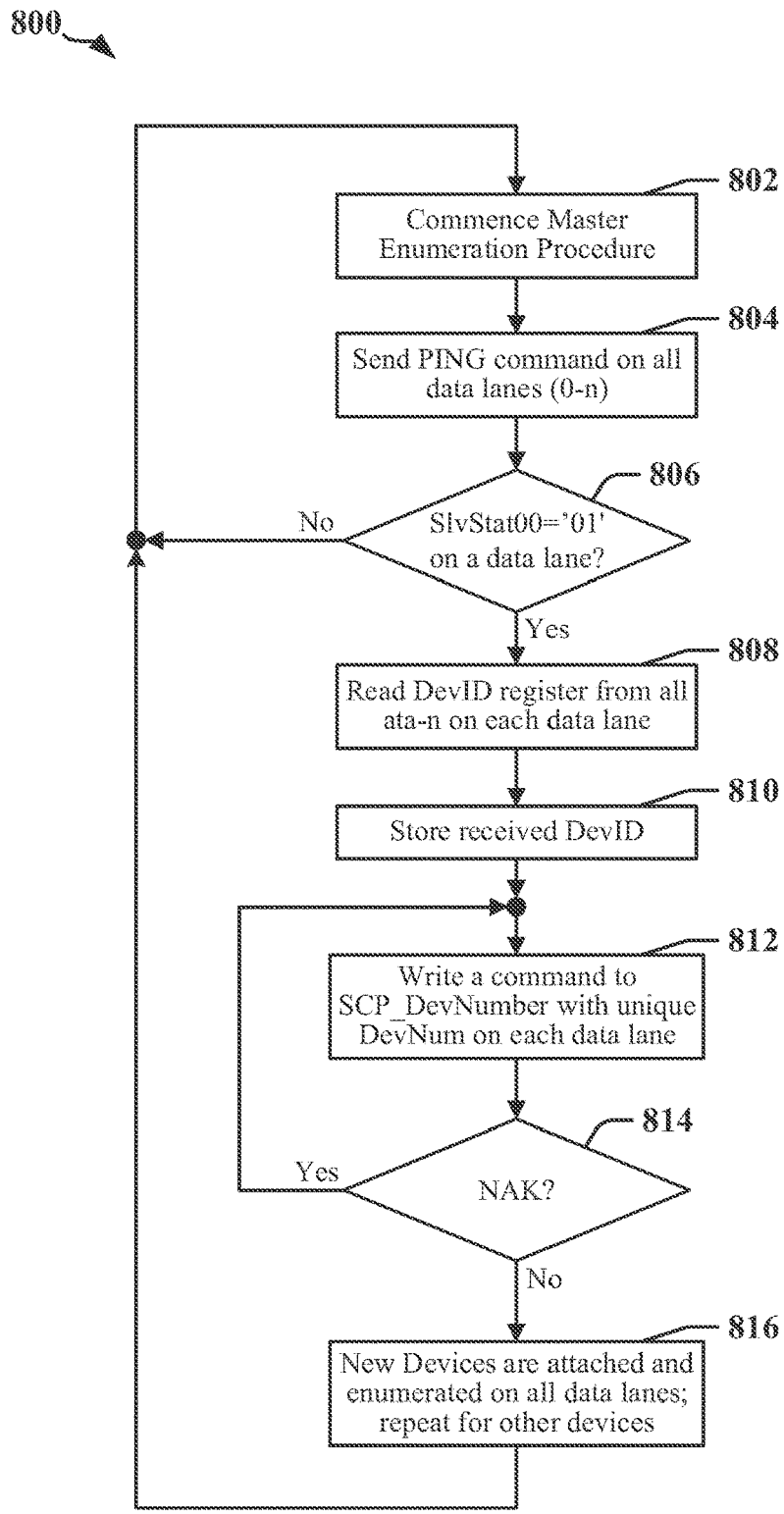
FIG. 8 illustrates a procedure for enumerating devices coupled to the SoundWire bus adapted to transmit control information over multiple data lanes in accordance with certain aspects disclosed herein.

FIG. 8 illustrates a procedure for enumerating devices coupled to the SoundWire bus 622 adapted to transmit control information over multiple data lanes 608, 610. The procedure 800 may commence at block 802 after initialization, in response to a notification of a change in configuration of hardware and/or in response to an interrupt.

At block 804, the SoundWire bus master 604 may transmit a PING command One or more unattached slave devices 612, 614, 616, 618, 620 may respond in Slv_Stat00[N] according to the data lane (N) through which the unattached slave device 612, 614, 616, 618, 620 is communicating. In some instances, an unattached slave device 612, 614, 616, 618, 620 may respond on more than one data lane.

At block 806, the SoundWire bus master 604 may determine that no unattached slave devices 612, 614, 616, 618, 620 have responded and the procedure may restart or wait to restart at block 802. When the SoundWire bus master 604 has determined that at least one un-attached slave device 612, 614, 616, 618, 620 has responded, the procedure continues at block 808.

At block 808, the SoundWire bus master 604 may read device identifier (DevID) registers from the slave devices 612, 614, 616, 618, 620. The SoundWire bus master 604 may issue a series of commands to read the DevID registers. For each DevID read, the slave devices 612, 614, 616, 618, 620 with the highest DevID value responds in each data lane. It is possible that different DevID may be reported on each data lane.

At block 808, the SoundWire bus master 604 may select a unique device number (DevNum) for each slave device 612, 614, 616, 618, 620, where the DevNum is assigned once per data lane.

At block 812, the SoundWire bus master 604 may write DevNum=0 a new SCP_DevNumber that is allocated or otherwise corresponds to the desired device. The SoundWire bus master 604 may use the same Frame to write to all devices by asserting a unique DevNum on each data lane. The SoundWire bus master 604 may perform independent writes to each slave device 612, 614, 616, 618, 620 in different transmissions.

At block 814, the SoundWire bus master 604 may determine if a NAK response has been received. A NAK response may be received from any one of the data lanes. The occurrence of NAK on a data lane indicates only that the DevNum written through that data lane did not take effect.

At block 816, one or more newly connected devices have been enumerated on all data lanes. The procedure may restart or wait to restart at block 802.

The combined slave status from all data lanes can be assumed to represent the enumerated slaves when the enumeration procedure has been completed.

A SoundWire bus master 604 may synchronize and/or coordinate the implementation of configuration changes at two or more slave devices 612, 614, 616, 618, 620. For example, it can be advantageous and/or desirable that configuration changes affecting multiple microphones 232, 234 and/or multiple loudspeakers 236, 238 (see FIG. 2) be implemented at the same time. The SoundWire bus master 604 may synchronize implementation of configuration changes by communicating the changes to the affected devices and implementing the changes using a broadcast command Synchronization of configuration changes implementation may be achieved by providing two or more banks of configuration registers in each of the slave devices 612, 614, 616, 618, 620. One bank of configuration registers may be used to control and configure certain functions and operations of each slave device 612, 614, 616, 618, 620, while the other bank of configuration registers may be unused and can be configured by the SoundWire bus master 604 without immediately affecting operation of the slave device 612, 614, 616, 618, 620. In normal operation, the SoundWire bus master 604 may configure all registers on an unused bank of configuration registers and may activate the changed configurations by sending a broadcast write to all devices (a Bank-Switch command) The Bank-Switch command signals the slave devices 612, 614, 616, 618, 620 on all data lanes to switch between banks of configuration registers.

In some instances, a NAK response to a Bank-Switch command may be received from one of the data lanes, indicating that the switchover of failed in at least one slave device 612, 614, 616, 618, 620. The failure of one or more slave devices 612, 614, 616, 618, 620 to implement a configuration change can result in bus malfunction. According to certain aspects disclosed herein, the SoundWire bus master 604 may cancel and/or reverse the Bank-Switch command at all slave devices 612, 614, 616, 618, 620, including devices that did not return a NAK. In one example, the SoundWire bus master 604 may issue one or more immediate broadcast writes over all data lanes 608, 610 to switch back to the original bank of configuration registers and thereby restore the previously functioning configuration. In another example, the SoundWire bus master 604 may issue one or more immediate "switch back" broadcast writes over any data lanes 608, 610 that returned a NAK, when a partial configuration failure can be tolerated. After a NAK is received in response to a first Bank-Switch command, the SoundWire bus master 604 may retry reconfiguration by resending the Bank-Switch command for a defined or configured number of times. In the event that a command-fail (i.e. NAK received) is repeatedly signaled in response to a series of repeated Bank-Switch commands, the SoundWire bus master 604 may determine that a serious or fundamental issue is affecting the system 600 and the SoundWire bus master 604 may initiate a reset of the system.

According to certain aspects, duplication of command codes (see Bits 01, 02, 03 in Table 1) may occur for all commands except for WRITE commands transmitted during the final stage of the enumeration process where a new device number is written to current device 0 (see block 812) (see also Bits 04-07 in Table 3). In block 812, a different DevNum is written on the different lanes. In some instances, enumeration may be handled one data lane at a time. In one example, a sequence for enumerating data lanes commences with the primary data lane and subsequently enumerates the secondary data lanes one at a time.

Figure 9:
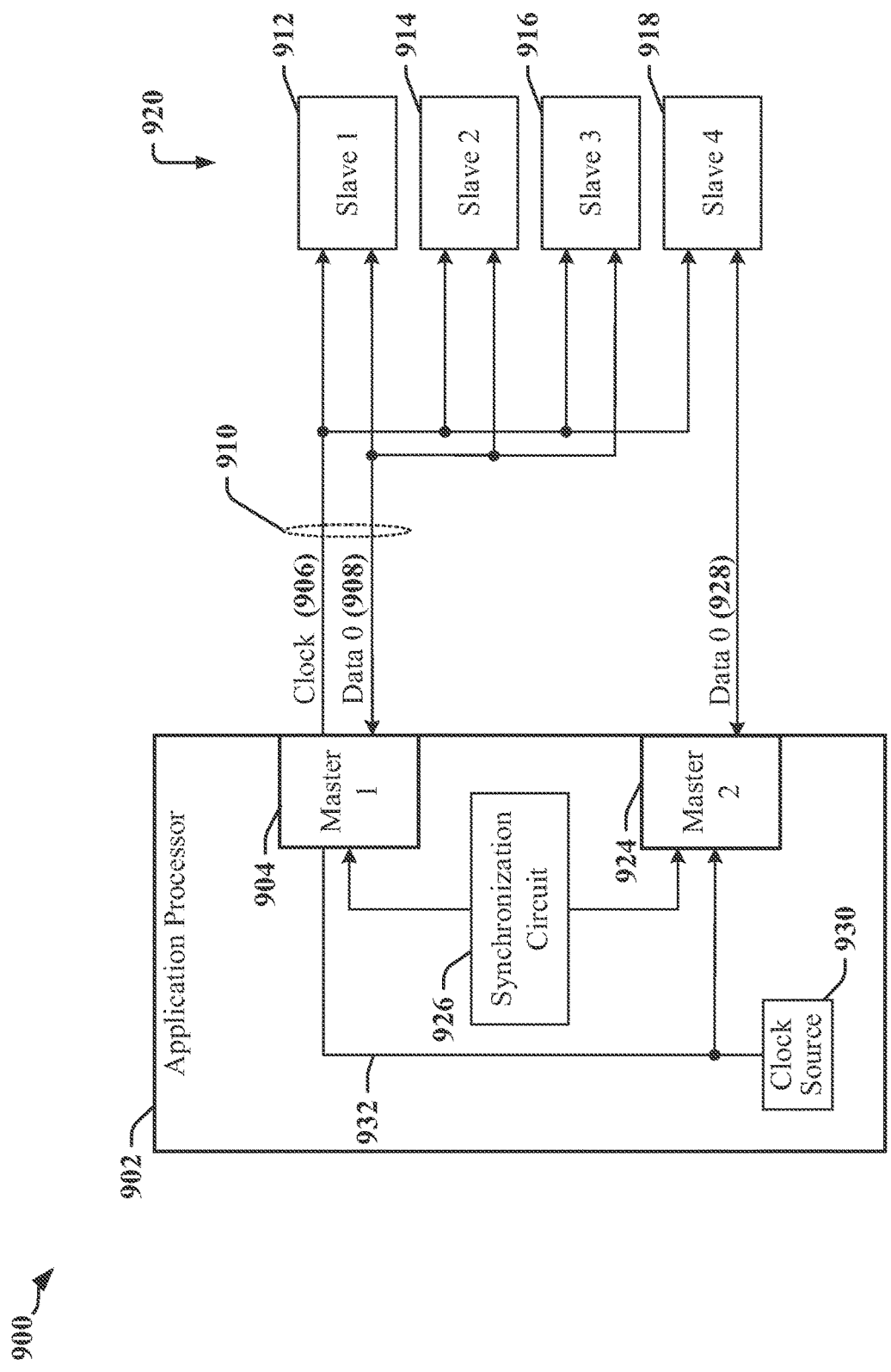
FIG. 9 illustrates the use of multiple SoundWire bus masters to support slave devices implemented with a single data lane SoundWire interface in accordance with certain aspects disclosed herein.

FIG. 9 illustrates a system 900 in which an application processor 902 includes multiple SoundWire bus masters 904, 924, each supporting multiple data lanes to enable communication with a plurality of slave devices 920. One or more slave devices 912, 914, 916, 918 may be implemented with a single data lane SoundWire interface. The illustrated system 900 can accommodate slave devices 912, 914, 916, 918 that have single data pin when aggregate bandwidth exceeds the capacity of the primary data lane 908 driven by the first SoundWire bus master 904. The second SoundWire bus master 924 provides an additional primary data lane 928 that carries control information. In one example, the first SoundWire bus master 904 is coupled to a clock lane 906 and the primary data lane 908 through designated terminals of the application processor 902, and the second SoundWire bus master 924 is coupled to the additional primary data lane 928 through another designated terminal of the application processor 902.

The system 900 provides a clock signal in a single clock lane 906 generated by one of the SoundWire bus masters 904, 924. A common clock lane 906 is used by the SoundWire bus masters 904, 924. A synchronization circuit 926 may be configured to synchronize signaling of the SoundWire bus masters 904, 924. In one example, the synchronization module and/or circuit 926 may be configured to ensure frame synchronization (Frame_Sync). Frame synchronization may include synchronizing frame size and frame start. In one example, the synchronization module and/or circuit 926 may be configured to synchronize bank switch events, and may the synchronization module and/or circuit 926 may generate a bank switch trigger (BankSwTrig) signal to trigger synchronized broadcast write commands. In another example, the synchronization module and/or circuit 926 may be configured to synchronize a stream synchronization point (SSP) event associated with each SoundWire bus master 904, 924. The SSP event may be signaled by transmitting an SSP bit in the PING frame at regular intervals to maintain alignment between links with different frame rates and/or sampling rates. The SSP event can be used to maintain phase coherence between slave devices.

In some aspects, a first SoundWire bus master 904 is configured to generate the clock signal transmitted in the clock lane 906 of the SoundWire bus 910, and the clock signal is fed to a second SoundWire bus master 924 within the application processor 902. In another example, a clock source 930 provides each SoundWire bus master 904, 924 an internal clock signal 932 that is used to generate versions of the clock signal transmitted on the clock lane 906 of the SoundWire bus 910 for use by the SoundWire bus masters 904, 924.

In various examples, the first SoundWire bus master 904 operates as a primary master and one or more SoundWire bus masters 924 is modified to operate as a dependent master. An output pin on the application processor 902 is saved when the slave devices 912, 914, 916, 918 are coupled to a common clock lane 906 and use the same clock signal.

In one implementation, the primary master may be configured to control the frame size, such that each data lane 908, 928 carries frames having the same frame size. The primary master may be configured to control the bus frame start event, control the SSP events and control bank switch events. A dependent master may configure its internal SoundWire bus clock rate to follow the bus clock rate of the primary master. When a common clock source 930 is used, for example, the primary master and dependent master may generate synchronously-divided SoundWire bus clocks. The dependent master may use a frame size that is identical to the frame size used by the primary master. The dependent master may use the frame starting point controlled by the primary master. The dependent master may use an SSP event value identical to the SSP event value used by the primary master. The primary master and dependent master may generate respective bank switch commands following a synchronized software request, or after a synchronized hardware initiation using an external trigger event provided by the primary master.

Additional Descriptions of Certain Aspects

Figure 10:
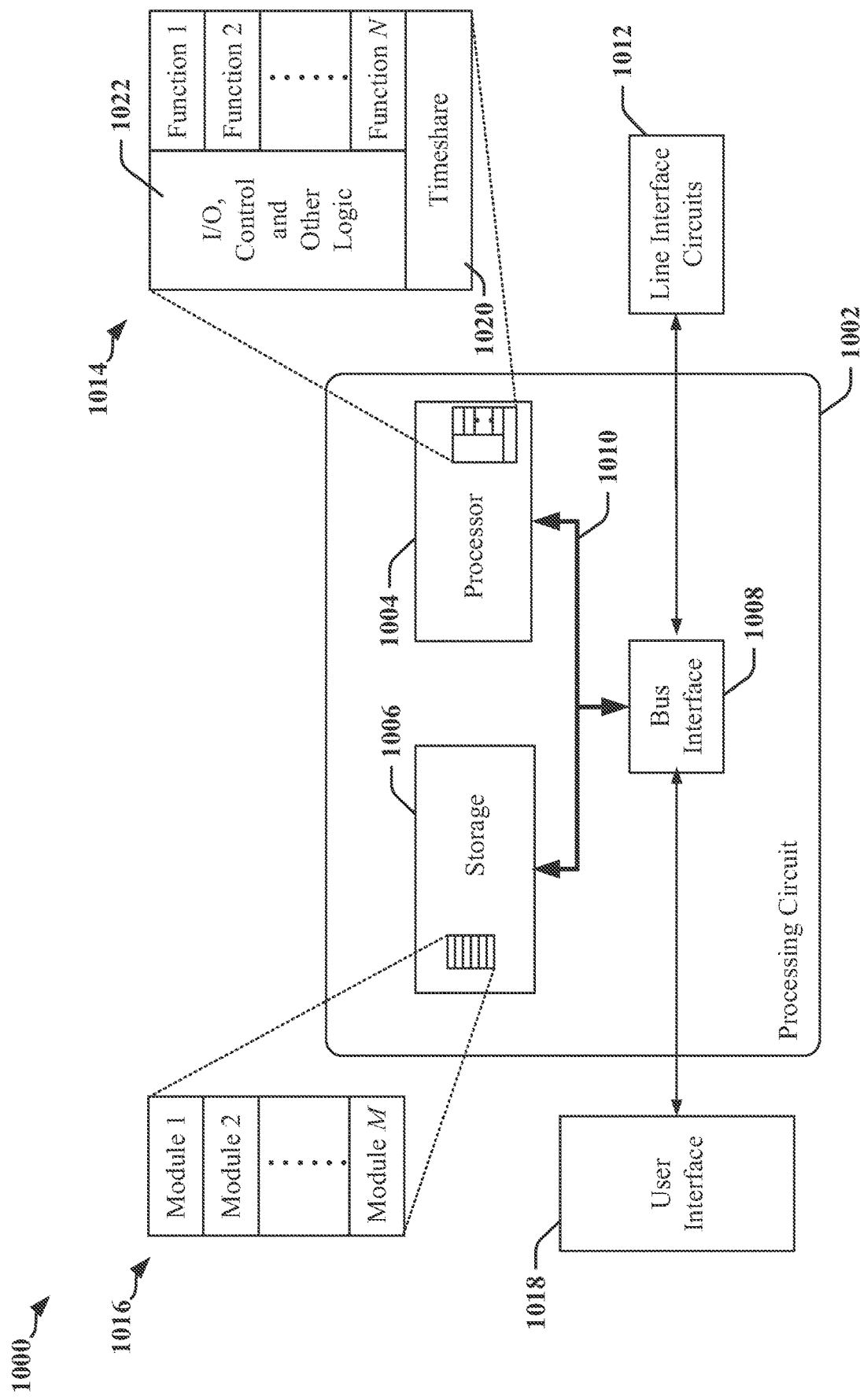
FIG. 10 is a diagram illustrating an example of an apparatus employing a processing circuit that may be adapted according to certain aspects disclosed herein.

FIG. 10 is a conceptual diagram illustrating a simplified example of a hardware implementation for an apparatus 1000 employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), ASICs field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more line interface circuits 1012. A line interface circuit 1012 may be provided for each networking technology supported by the processing circuit. In some instances, multiple networking technologies may share some or all of the circuitry or processing modules found in a line interface circuit 1012. Each line interface circuit 1012 provides a means for communicating with various other apparatus over a transmission medium. Depending upon the nature of the apparatus, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the line interface circuit 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the line interface circuit 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the line interface circuit 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
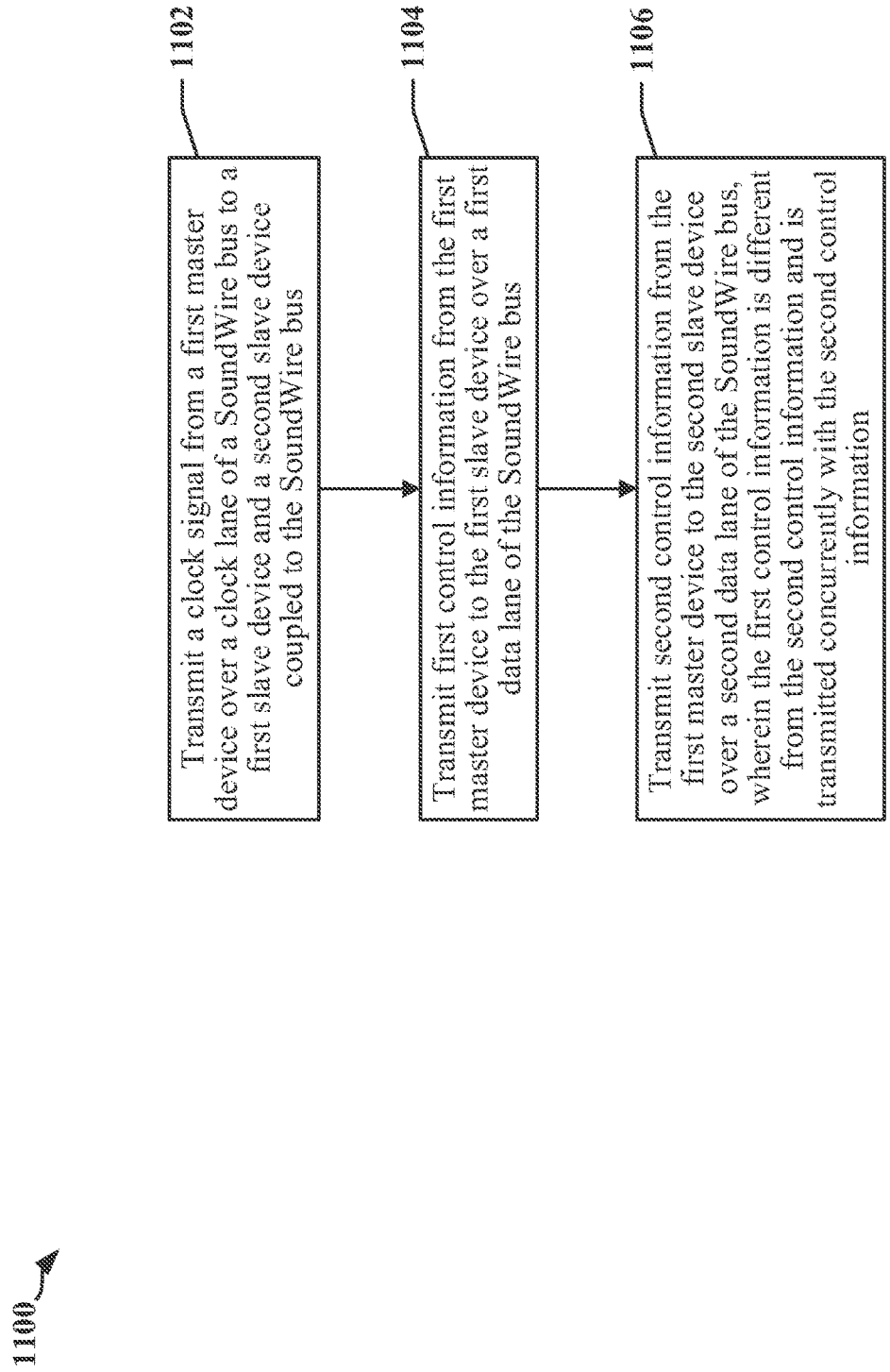
FIG. 11 is a flow chart of a data transfer method operational on one of two devices in an apparatus.

FIG. 11 is a flow chart 1100 of a method operational in one or more master devices coupled to a SoundWire bus.

At block 1102, the first device may provide a clock signal provided by a first master device over a clock lane of a SoundWire bus to a first slave device and a second slave device coupled to the SoundWire bus. The first data lane may be coupled to a primary data terminal of the first master device and the second data lane is coupled to a secondary data terminal of the first master device. The first control information may be transmitted in a first frame directed to one or more slave devices coupled to a first wire of the SoundWire bus. The control information may be transmitted in a second frame directed to one or more slave devices coupled to a second wire of the SoundWire bus.

At block 1104, the first master device may transmit first control information from the first master device to the first slave device over a first data lane of the SoundWire bus.

At block 1106, the first master device may transmit second control information from the first master device to the second slave device over a second data lane of the SoundWire bus. The first control information may be different from the second control information and is transmitted concurrently with the second control information. The first master device may transmit additional control information from the first master device other slave devices over one or more other data lanes of the SoundWire bus. The first control information may be different from the additional control information and may be transmitted concurrently with the additional control information.

In some examples, the first master device may be configured to drive the clock lane of the SoundWire bus, the first data lane and the second data lane. The first master device may include a SoundWire bus interface circuit operable to drive three or more wires of the SoundWire bus. The second slave device may include a SoundWire bus interface circuit configured to support a single data lane.

In certain examples, the first master device may send a PING command in the first data lane and the second data lane, and enumerate a plurality of devices coupled to the SoundWire bus based on responses to the PING command received from the first slave device and the second slave device. The plurality of devices may be enumerated by assigning a device number to each of the plurality of devices. Each device number may be unique to a data wire coupling a corresponding device to the first master device. The plurality of devices may include at least twelve slave devices. The first master device may associate fields of a frame transmitted on the SoundWire bus with a number representing a data wire to which a target of the frame is coupled.

The first data lane may be a primary data lane associated with the first master device, the second data lane may be a primary data lane associated with the second master device. The first master device and the second master device may be provided in an application processor or Codec. The first master device may include a circuit or module operable to synchronize frame timing of the second master device with frame timing of the first master device. The first master device may include a circuit or module operable to synchronize an SSP defined for the second master device with an SSP defined for the first master device. The first master device may include a circuit or module operable to synchronize timing of a bank switching signal transmitted by the second master device with a bank switching signal transmitted by the first master device. The bank switching signal transmitted by the second master device may include a broadcast write command.

Figure 12:
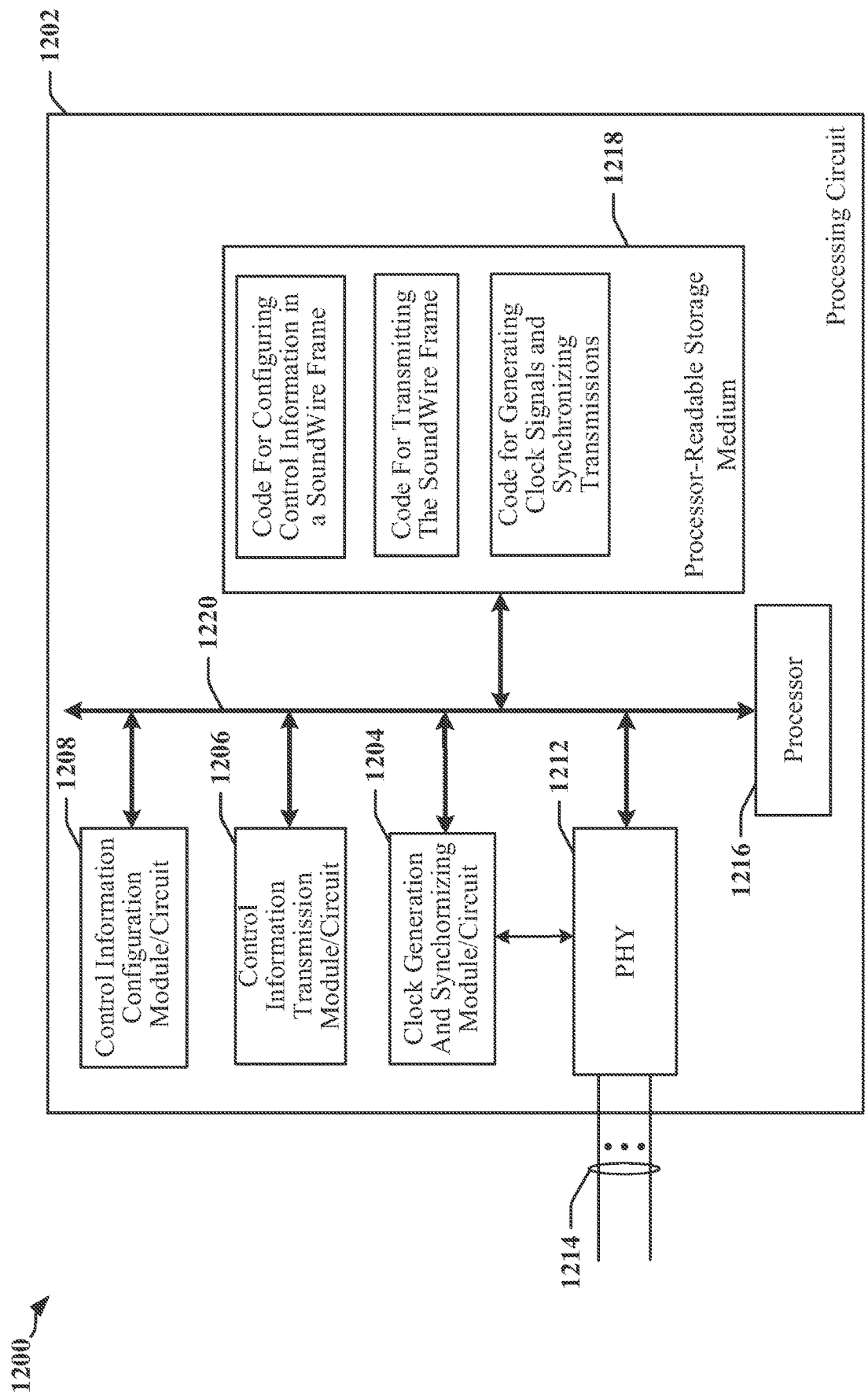
FIG. 12 is a diagram illustrating an example of a hardware implementation for an apparatus employing a processing employing a processing circuit adapted according to certain aspects disclosed herein.

FIG. 12 illustrates an example of a hardware implementation for an apparatus 1200 employing a processing circuit 1202. The processing circuit typically has a processor 1216 that may include one or more of a microprocessor, microcontroller, digital signal processor, a sequencer and a state machine. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the processor 1216, the modules or circuits 1204, 1206, 1208, and 1208, a PHY 1212 configurable to communicate over connectors or wires of a multi-wire communication link 1214 and the computer-readable storage medium 1218. The bus 1220 may also link various other circuits such as timing sources, peripherals, voltage regulators, and power management circuits.

The processor 1216 is responsible for general processing, including the execution of software stored on the computer-readable storage medium 1218. The software, when executed by the processor 1216, causes the processing circuit 1202 to perform the various functions described supra for any particular apparatus. The computer-readable storage medium 1218 may also be used for storing data that is manipulated by the processor 1216 when executing software, including data decoded from symbols transmitted over the multi-wire communication link 1214, which may be configured as data lanes and clock lanes. The processing circuit 1202 further includes at least one of the modules 1204, 1206, 1208, and 1208. The modules 1204, 1206, 1208, and 1208 may be software modules running in the processor 1216, resident/stored in the computer-readable storage medium 1218, one or more hardware modules coupled to the processor 1216, or some combination thereof. The 1204, 1206, 1208, and/or 1208 may include microcontroller instructions, state machine configuration parameters, or some combination thereof.

In one configuration, the multi-wire communication link 1214 is operated in accordance with SoundWire protocols. The apparatus 1200 may include a module or circuit 1204 configured to provide a clock signal on a clock lane of the multi-wire communication link 1214 to a first slave device and a second slave device coupled to the multi-wire communication link 1214 and operated in accordance with SoundWire protocols. The apparatus 1200 may include a module or circuit 1206 configured to transmit first control information from the first master device to the first slave device over a first data lane of the SoundWire bus, and transmit second control information from the first master device to the second slave device over a second data lane of the SoundWire bus. The apparatus 1200 may include a module or circuit 1208 adapted to configure the first control information and the second control information. The first control information may be different from the second control information and the first control information may be transmitted concurrently with the second control information.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method comprising:
    causing a first master device to transmit a clock signal over a clock lane of a SoundWire bus that is coupled to the first master device, wherein a first slave device, which is operated in accordance with a SoundWire protocol, is coupled to the clock lane and a first data lane of the SoundWire bus and wherein a second slave device, which is operated in accordance with the SoundWire protocol, is coupled to the clock lane and a second data lane of the SoundWire bus;
    causing the first master device to transmit first control information to the first slave device over the first data lane under control of the clock signal and in accordance with the SoundWire protocol; and
    causing second control information to be transmitted to the second slave device over the second data lane under control of the clock signal and concurrently with transmission of the first control information to the first slave device, wherein the second slave device is configured to receive the second control information while operating in accordance with the SoundWire protocol,
    wherein the first control information is different from the second control information.

2. The method of claim 1, wherein the first data lane comprises a first wire that is coupled to a primary data terminal of the first master device and the second data lane comprises a second wire that is coupled to a secondary data terminal of the first master device, such that the first slave device receives the first control information concurrently with reception of the second control information by the second slave device.

3. The method of claim 1, wherein the first control information is transmitted in a first frame directed to one or more slave devices coupled to the first data lane of the SoundWire bus, and wherein the second control information is transmitted in a second frame directed to one or more slave devices coupled to the second data lane of the SoundWire bus.

4. The method of claim 1, wherein the second slave device includes a SoundWire bus interface circuit that supports a single data lane, the second slave device being coupled to the second data lane of the SoundWire bus through the SoundWire bus interface circuit.

5. The method of claim 1, further comprising:
    causing the first master device to transmit third control information over a third data lane of the SoundWire bus under control of the clock signal and in accordance with the SoundWire protocol.

6. The method of claim 1, wherein the second slave device comprises a SoundWire bus interface circuit configured to support a single data lane.

7. The method of claim 1, further comprising:
    sending a PING command in the first control information and the second control information; and
    enumerating a plurality of devices coupled to the SoundWire bus based on responses to the PING command received from the plurality of devices.

8. The method of claim 7, further comprising:
    assigning a lane number to each of the plurality of devices, wherein each lane number corresponds to a wire associated with the first data lane or a wire associated with the second data lane.

9. The method of claim 8, further comprising:
    at the first master device, associating fields of a frame transmitted on the SoundWire bus with a number representing a wire to which a target of the frame is coupled.

10. The method of claim 7, wherein the plurality of devices comprises at least twelve slave devices.

11. The method of claim 1, further comprising:
    sending a PING command in the first control information and the second control information, wherein the PING command signals a stream synchronization point event.

12. The method of claim 1, further comprising:
    causing a second master device that is collocated with the first master device to transmit the second control information to the second slave device over the second data lane,
    wherein the first data lane is a primary data lane carried on a first wire driven by the first master device, and the second data lane is a primary data lane carried on a second wire driven by the second master device, and wherein the first master device and the second master device are provided in an application processor or coder-decoder (Codec).

13. The method of claim 12, further comprising:
    synchronizing frame timing of the second master device with frame timing of the first master device.

14. The method of claim 12, further comprising:
    synchronizing a stream synchronization point defined for the second master device with a stream synchronization point defined for the first master device.

15. The method of claim 12, further comprising:
    synchronizing timing of a bank switching signal transmitted by the second master device with a bank switching signal transmitted by the first master device.

16. The method of claim 15, wherein the bank switching signal transmitted by the second master device includes a broadcast write command.

17. An apparatus comprising:
    a SoundWire bus comprising a clock lane, a first data lane and a second data lane;
    an application processor coupled to at least the clock lane and the first data lane through a first SoundWire bus interface;
    a first slave device that is operated in accordance with a SoundWire protocol and that is coupled to the clock lane and the first data lane; and a second slave device that is operated in accordance with the SoundWire protocol and that is coupled to the clock lane and the second data lane, wherein the first SoundWire bus interface is configured to:
 transmit a clock signal over the clock lane;
 transmit first control information to the first slave device over the first data lane under control of the clock signal and in accordance with the SoundWire protocol; and
 concurrently with transmission of the first control information to the first slave device, transmit second control information to the second slave device over the second data lane under control of the clock signal, wherein the second slave device is configured to receive the second control information while operating in accordance with the SoundWire protocol, wherein the first control information is different from the second control information.

18. The apparatus of claim 17, wherein the second slave device comprises a two-wire SoundWire interface.

19. The apparatus of claim 17, wherein the first data lane is a primary data lane of the SoundWire bus and the second data lane is a secondary data lane of the SoundWire bus, and wherein the first SoundWire bus interface comprises a SoundWire bus master interface circuit operable to drive three or more wires of the SoundWire bus.

20. The apparatus of claim 19, wherein the first SoundWire bus interface is further configured to:
 transmit the first control information in a first frame directed to one or more slave devices coupled to the SoundWire bus over a first wire that is coupled to the first slave device; and
 transmit the second control information in a second frame directed to one or more slave devices coupled to the SoundWire bus over a second wire that is coupled to the second slave device.

21. The apparatus of claim 17, wherein the first Sound-Wire bus interface is further configured to:
 send a PING command on the first data lane and the second data lane; and
 enumerate a plurality of devices coupled to the Sound-Wire bus based on responses to the PING command received from the plurality of devices.

22. The apparatus of claim 21, wherein the first Sound-Wire bus interface is further configured to:
 assign a device number to each of the plurality of devices, wherein each device number is unique to a wire coupling a corresponding device to the apparatus.

23. The apparatus of claim 22, wherein the first Sound-Wire bus interface is further configured to:
 associate fields of a frame transmitted on the SoundWire bus with a number representing a wire to which a target of the frame is coupled.

24. The apparatus of claim 17, wherein the first Sound-Wire bus interface is further configured to transmit a first frame over a primary data lane of the SoundWire bus, and wherein the application processor further comprises:
 a second SoundWire bus interface configured to operate as a SoundWire master and to transmit a second frame over a secondary data lane of the SoundWire bus; and
 a synchronizing circuit configured to synchronize frame timing of the first SoundWire bus interface with frame timing of the second SoundWire bus interface.

25. An apparatus comprising:
 means for causing a first master device to transmit a clock signal over a clock lane of a SoundWire bus that is coupled to the first master device, wherein a first slave device, which is operated in accordance with a Sound-Wire protocol, is coupled to the clock lane and a first data lane of the SoundWire bus and wherein a second slave device, which is operated in accordance with the SoundWire protocol, is coupled to the clock lane and a second data lane of the SoundWire bus;
 means for transmitting control information over the SoundWire bus, the means for transmitting control information being configured to:
  transmit first control information from the first master device to the first slave device over the first data lane under control of the clock signal and in accordance with the SoundWire protocol; and
  transmit second control information to the second slave device over the second data lane under control of the clock signal concurrently with transmission of the first control information to the first slave device, wherein the second slave device is configured to receive the second control information while operating in accordance with the SoundWire protocol,
 wherein the first control information is different from the second control information and is transmitted concurrently with the second control information, and wherein the second slave device comprises a two-wire Sound-Wire interface.

26. The apparatus of claim 25, further comprising:
 means for sending a PING command on the first data lane and the second data lane; and
 means for enumerating a plurality of devices coupled to the SoundWire bus based on responses to the PING command received from the plurality of devices.

27. The apparatus of claim 25, wherein:
 the means for transmitting the first control information includes a first interface device configured to operate as a SoundWire master and to drive a first wire of the SoundWire bus,
 the means for transmitting the second control information includes a second interface device configured to operate as a SoundWire master and to drive a second wire of the SoundWire bus, and
 wherein the apparatus comprises means for synchronizing frame timing of the first interface device with frame timing of the second interface device.

28. A non-transitory processor-readable medium storing processor-executable code, comprising code for causing a processor to:
 cause a first master device to transmit a clock signal over a clock lane of a SoundWire bus that is coupled to the first master device, wherein a first slave device, which is operated in accordance with a SoundWire protocol, is coupled to the clock lane and a first data lane of the SoundWire bus and wherein a second slave device, which is operated in accordance with the SoundWire protocol, is coupled to the clock lane and a second data lane of the SoundWire bus;
 cause the first master device to transmit first control information to the first slave device over the first data lane under control of the clock signal and in accordance with the SoundWire protocol; and
 cause second control information to be transmitted to the second slave device over the second data lane under control of the clock signal concurrently with transmission of the first control information to the first slave device, wherein the second slave device is configured to receive the second control information while operating in accordance with the SoundWire protocol, wherein the first control information is different from the second control information, and wherein the second slave device comprises a two-wire SoundWire interface.

29. The processor-readable medium of claim 28, further comprising code for causing the processor to:
   send a PING command on the first data lane and the second data lane; and
   enumerate a plurality of devices coupled to the SoundWire bus based on responses to the PING command received from the plurality of devices.

30. The processor-readable medium of claim 28, further comprising code for causing the processor to:
   cause a second master device that is collocated with the first master device to transmit the second control information over a second wire of the SoundWire bus, wherein the first master device is configured to drive a first wire of the SoundWire bus; and
   synchronize frame timing of a SoundWire bus interface circuit in the first master device with frame timing of a SoundWire bus interface circuit in the second master device.

* * * * *